Feb. 28, 1961 W. DU BROFF 2,972,843
APPARATUS FOR PERIMETRIC TAPING
Filed Oct. 30, 1958 4 Sheets-Sheet 1
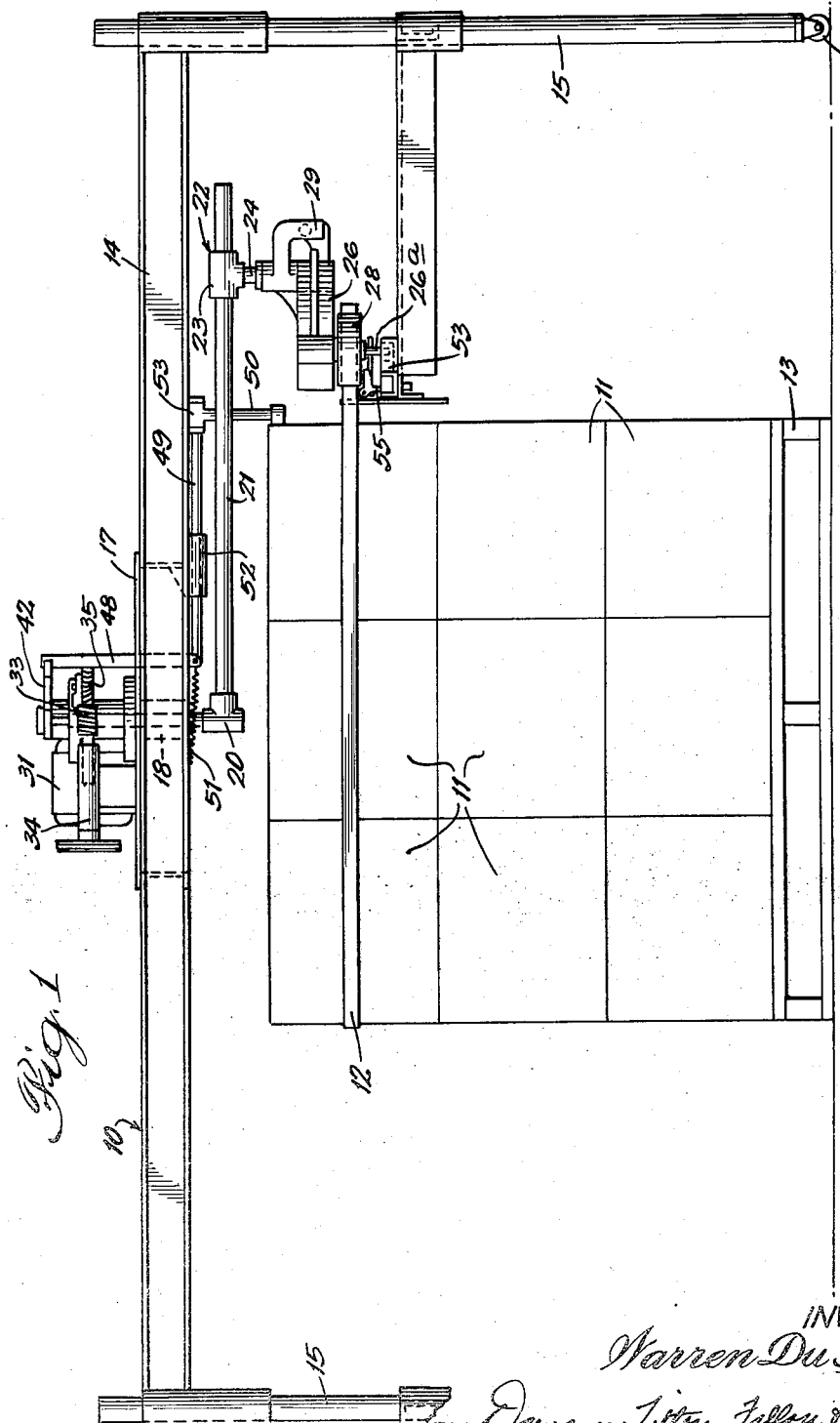
INVENTOR:
Warren Du Broff,
BY Dawson, Tilton, Fallon & Lungmus,
ATTORNEYS.

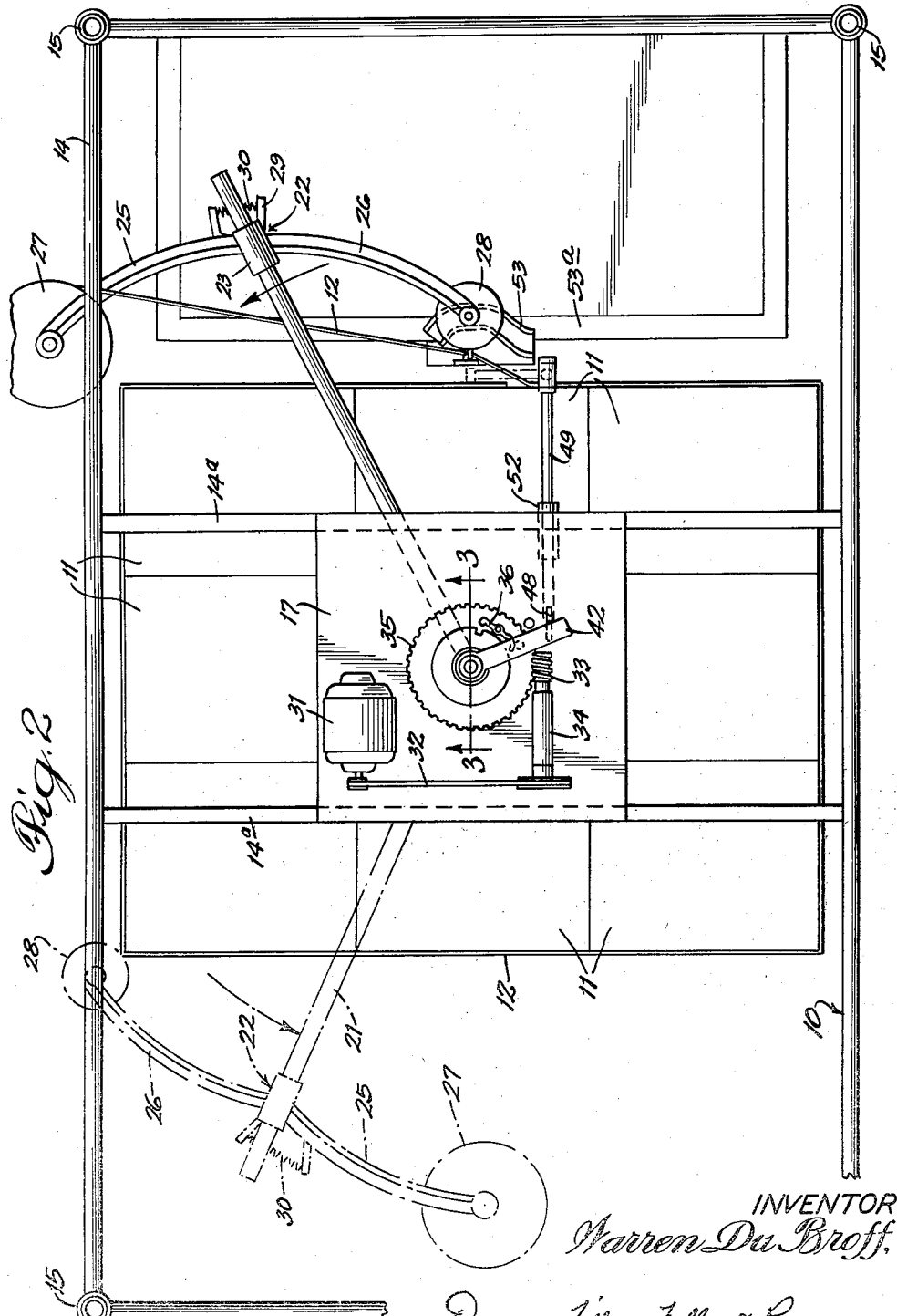

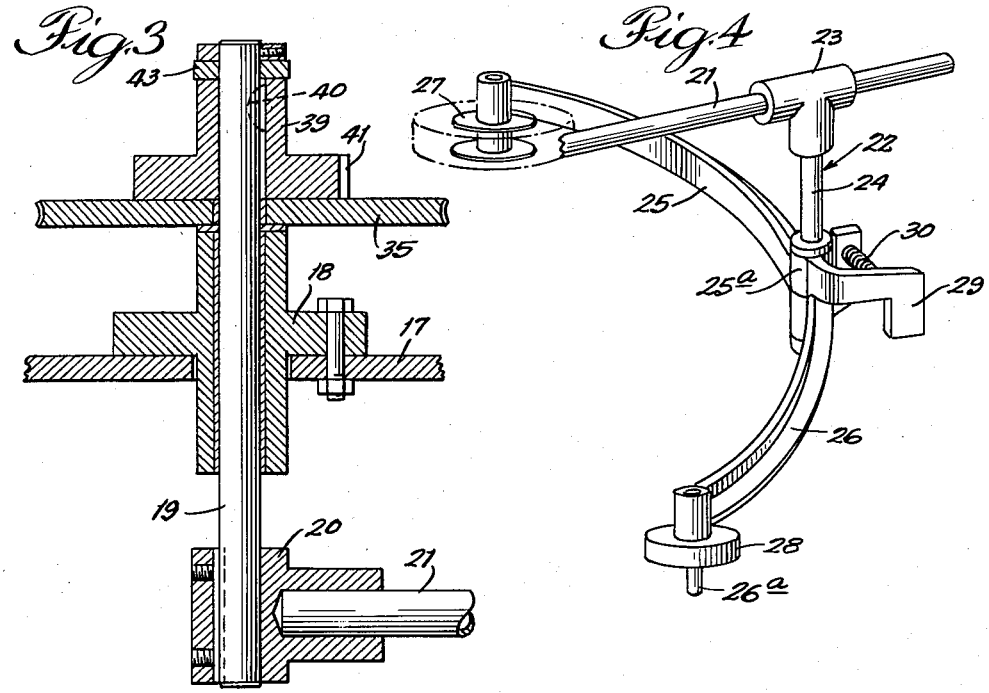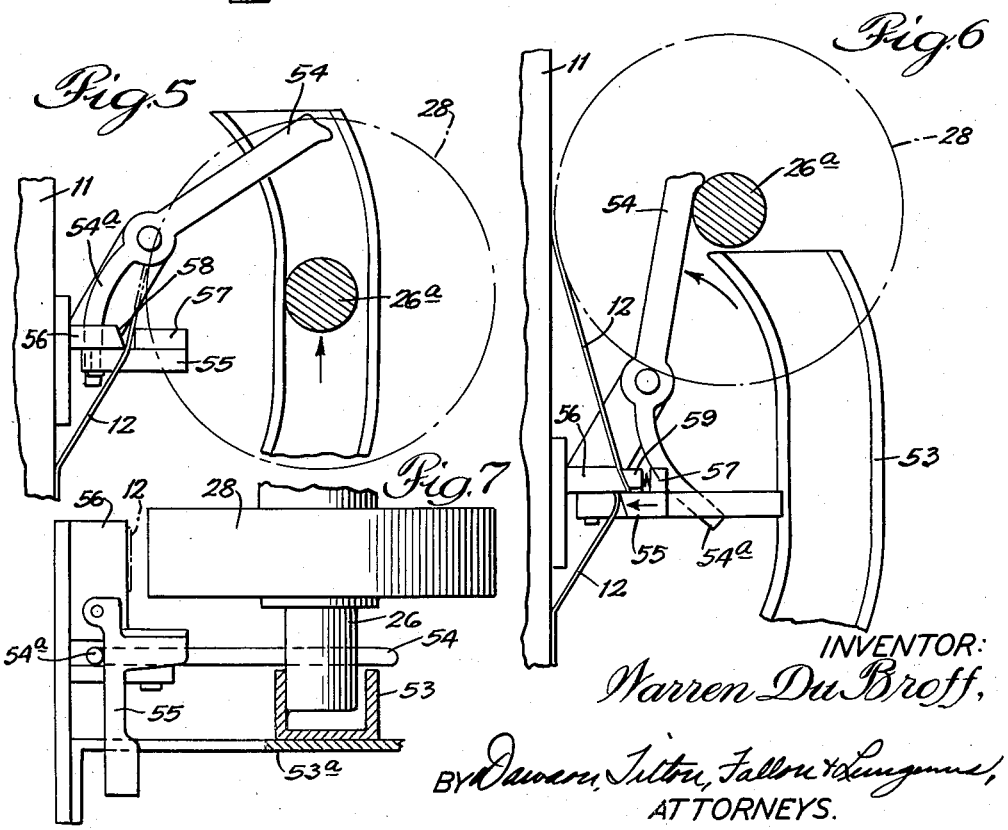

Feb. 28, 1961 W. DU BROFF 2,972,843
APPARATUS FOR PERIMETRIC TAPING
Filed Oct. 30, 1958 4 Sheets-Sheet 4
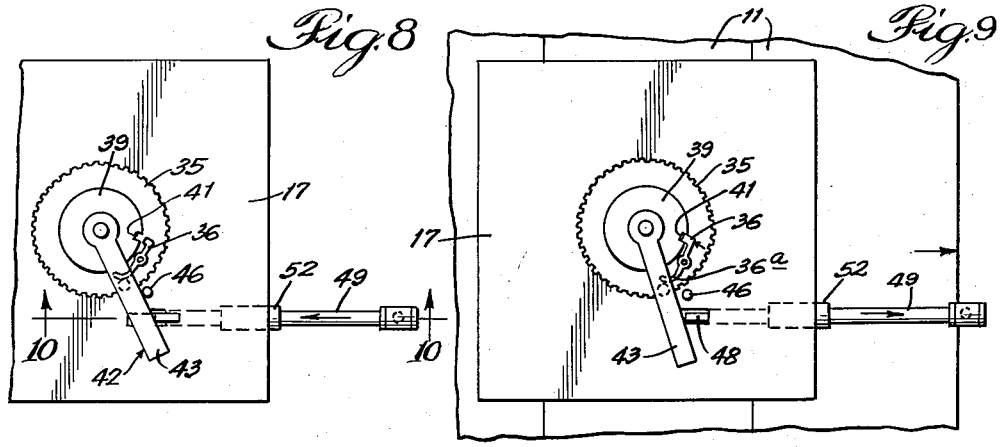
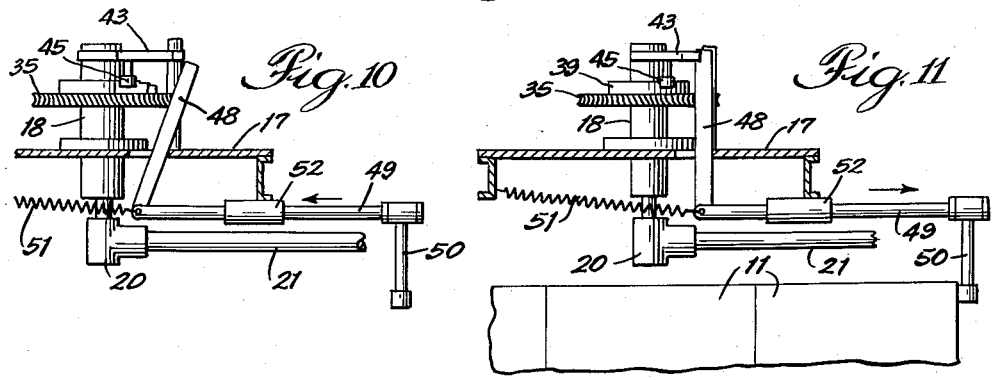
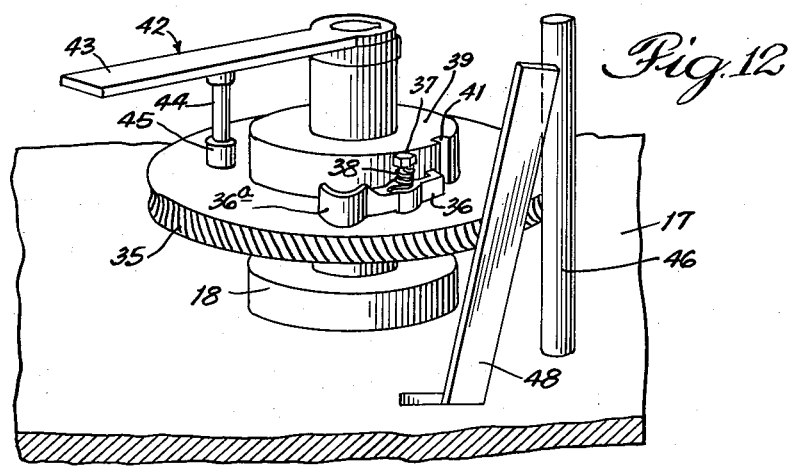
INVENTOR:
Warren Du Broff,
BY Dawson, Tilton, Fallon & Lungmus,
ATTORNEYS.

United States Patent Office 2,972,843
Patented Feb. 28, 1961

2,972,843

APPARATUS FOR PERIMETRIC TAPING

Warren Du Broff, Highland Park, Ill., assignor to Charles Barancik, Chicago, Ill.

Filed Oct. 30, 1958, Ser. No. 770,630

18 Claims. (Cl. 53—74)

This invention relates to apparatus for perimetric taping, and is effective for applying adhesive-equipped tape to both smooth and irregularly-contoured objects.

The invention finds utility in banding together an assortment of objects such as might be exemplified by stacked cartons or cases. In the past, where cases, say of a rectangular nature, have had to be transported from place to place, it has been a common practice to arrange the cases in a number of stacks on a pallet. Thereafter, the pallet can be conveniently handled by a lift truck or similar vehicle for the necessary transportation. Where the cartons involved were vertically stacked, it has been the practice in the past to interlock the cases to form an arrangement similar to brickwork, where one case is laterally offset from the case next below. Such an operation is time-consuming and may often be wasteful of palletizing space. In addition, it presents numerous obstacles to automation. On the other hand, the stacking of one case directly above another has presented problems in that the uppermost cases in particular exhibit a tendency toward displacement under shock. I have noted that this tendency can be effectively minimized by banding together horizontal layers of cases, particularly the uppermost layer, and one of the objects of this invention is to provide a machine capable of achieving such banding.

Another object of this invention is to provide a machine capable of applying tape such as pressure-sensitive tape to the perimeter of an object or a number of objects grouped together. Still another object is to provide a perimetric taping machine which includes a frame providing a space available for the positioning of an object to be perimetrically taped and in which the frame is equipped with a subframe or mechanism that moves about the perimeter of the space to apply tape to an article positioned therein. Yet another object is to provide a perimetric taping machine in which tape is ready at all times to be applied to an object inserted into the machine and which is energized by the introduction of an article to be taped.

A further object is to provide a perimetric taping machine in which the tape-applying mechanism is initiated in its operation by a novel signalling means. A still further object is to provide, in a perimetric taping apparatus, a tape-applying mechanism that is selectively operative to apply tape to an article by making only one rotation about the article and thereafter holding additional tape in ready position for another taping operation. Other objects and advantages of this invention can be seen as this specification proceeds.

This invention, in an illustrative embodiment, will be described in conjunction with the accompanying drawing, in which—

Fig. 1 is a side elevational view of a perimetric taping machine constructed in accordance with the teachings of the invention and in which a palletized stack of cartons is seen to be subjected to a taping operation;

Fig. 2 is a fragmentary top plan view of the apparatus seen in Fig. 1;

Fig. 3 is an enlarged fragmentary vertical sectional view of the arm bearing and rotating portion of the apparatus;

Fig. 4 is an enlarged perspective view of the tape-applying subframe or mechanism of the apparatus;

Fig. 5 is an enlarged top plan view of the portion of the apparatus concerned with the tape-severing operation;

Fig. 6 is a view similar to Fig. 5 but with the parts thereof shown in a different operative position;

Fig. 7 is a side elevational view, partially in section, of the apparatus seen in Fig. 5;

Fig. 8 is a fragmentary top plan view of the arm energizing and rotating portion of the apparatus;

Fig. 9 is a view similar to Fig. 8 but with the elements thereof disposed in different functional relation;

Fig. 10 is a cross-sectional view, taken along the line 10—10 of Fig. 8;

Fig. 11 is a view similar to Fig. 10 but with the parts thereof disposed in different operating conditions and corresponding to the conditions shown in Fig. 9; and Fig. 12 is an enlarged perspective view of the mechanism seen in Figs. 8–11.

In the illustration given, the numeral 10 designates generally a frame which is rectangular in both elevation and plan (best appreciated from a comparison of Figs. 1 and 2). The frame 10 has an open central portion adapted to receive an article or articles which are to be perimetrically taped. This is illustrated in the drawing by a cluster of cartons 11, the uppermost layer of which are being banded by a tape 12 and which are supported upon a pallet 13. Although in this specification the perimetric taping device is described in terms of applying only a single tape to an article or articles to be perimetrically taped, it will be appreciated that the provision of elements for applying more than one band of tape is within the scope of the invention.

In the drawing, the object taped includes 27 cartons, arranged in the form of a rectangular solid, i.e., three high, three wide, and three deep. The upper portion or carriage 14 of the frame (see Fig. 1) is vertically positionable on the columns 15 to accommodate higher or lower articles or stacks. The frame 10 is also equipped with casters or wheels 16 which permit its ready relocation to a point, for example, convenient to a conveyor delivering stacked cases or other articles to be perimetrically taped.

The carriage portion 14 of the frame 10 is equipped with a supporting plate 17 approximately centrally located above the cluster of cases 11 and which is rigidly supported within the carriage portion 14 by means of transverse channels 14a. The plate 17 (as best seen in Fig. 3) rigidly mounts a bearing 18 in which is journaled a vertical shaft 19 for free rotation therein.

The shaft 19 is equipped with a collar 20 (again best seen in Fig. 3, but also seen in reduced size in Fig. 1), which supports a laterally or horizontally-extending arm 21.

The arm 21, remote from its attachment to shaft 19, carries a tape-applying subframe or mechanism designated generally by the numeral 22 and which can be seen in perspective form in Fig. 4. The subframe 22 is seen to include a tubular sleeve 23 positionably mounted on arm 21 and which supports a depending rod 24. The depending rod 24 in turn is equipped with a pair of laterally or horizontally-extending arms 25 and 26, respectively. Arm 25, at its unattached end, is equipped with a rotatably-mounted tape spool 27, while arm 26, at its unattached end, is equipped with a tape-smoothing or pressing roller 28. The rod-receiving portion 25a of arm 25 is equipped with a projection 29 which is resiliently connected by means of spring 30 to the end of arm 26 opposite to the end supporting roller 28. As can be readily appreciated from a consideration of the two views of the subframe 22 presented in Fig. 2, the spring 30 is extended whenever the roller 28 is forced outwardly from the pivotal mounting of arm 21. This spring extension is seen in the position of subframe 22 shown in the lefthand portion of Fig. 2.

Because of this arrangement, the roller 28 is resiliently urged in toward the center of the frame and is thereby operative to press tape securely and firmly against the outer surface of an article to be perimetrically taped. Both the tape supply spool and the pressing roller 28 are provided in the same horizontal plane, this plane being spaced below the plane defined by the rotational movement of arm 21, so that as the arm 21 rotates over the cluster of cases 11, the tape supply spool 27 and the pressing roller 28 will engage a portion of the cluster of cases somewhat below the top of the cluster.

The arm 25 is rigidly secured to rod 24 and, like arm 26, is arcuately outwardly deformed when viewed in plan. On the other hand, the arm 26 is movably mounted on rod 24 to permit the presser roller 28 to move in and out under the requirements of the surface being taped. The spool 27 is positioned a sufficient distance outwardly of the outermost projection of the surface being taped so that it at no time actually contacts the surface. Through the provision of arms of this character and disposition, the tape is quickly pressed against the surface after being unwound from spool 27, yet the apparatus is able to apply tape to projections such as the square corners shown. The resilient mounting results in the application of greater pressure on the projecting portions of the article so as to achieve a desirable tightening.

Rotation of the shaft 19, and hence arm 21, is achieved through the mechanism supported on plate 17 and which includes an electric motor 31. The motor 31 is equipped with a V-belt drive 32 operative to rotate a worm 33 suitably supported within a housing 34 on plate 17. The worm 33 is in constant engagement with a worm gear 35 (best seen in Fig. 12 and the other views on that sheet of the drawing). Thus, whenever motor 31 is operative to rotate worm 33, worm gear 35 will be rotating. Worm gear 35 (as seen in Fig. 3) is journaled for free rotation about shaft 19 so that even though worm gear 35 is rotated, no similar motion would be transmitted to shaft 19 and hence arm 21 and its associated tape-applying subframe 22. To couple the rotary motion of worm gear 35 to shaft 19, a detent mechanism in the nature of a pivotal dog 36 is provided. The dog 36 (as best seen in Fig. 12) is pivotally mounted on a post 37, secured in the top surface of worm gear 35. The post 37 is equipped with a spring 38 to continually urge dog 36 inwardly and against the circular face of a collar 39 rigidly and unrotatably attached to shaft 19 as at 40 (see Fig. 3). Thus, as worm gear 35 rotates, the dog 36 follows the circular contour of collar 39. The circular contour of collar 39 is equipped with a dog recess 41, into which the dog 36 may enter to provide the configuration of elements seen in Fig. 9.

A holdback mechanism for dog 36 is provided on shaft 19 and is designated generally by the numeral 42. The holdback mechanism 42 includes an arm member 43 mounted for free rotation on shaft 19. The arm member 43 is equipped with a depending post 44, to which is rotatably secured a cam roller 45. As the worm gear 35 rotates, the dog 36, with its extended cam 36a, rotates with it and ultimately engages cam roller 45. The continued movement of worm gear 35 after engagement causes arm member 43 to rotate with the worm gear until the arm member 43 is stopped by engagement with post 46. At this juncture, the further rotation of worm gear 35 causes cam 36a to be pivoted inwardly against the action of spring 38 and pivot dog 36 outwardly and away from the recess-equipped collar 39.

Post 46 is so positioned as to cause the outward pivoting of dog 36 at the time it ordinarily would engage the recess 41. Once cam 36a passes by cam roller 45, the dog 36 is urged back into contact with collar 39 and remains in such relationship for the remainder of a given single rotation of worm gear 35. So long as arm member 43 is positioned against post 46, the dog will be prevented from latching with recess 41 once each revolution of worm gear 35. The position of the dog 36 and cam 36a at the moment of alignment with recess 41 but where engagement is prevented by post 46 and the holdback mechanism 42, is represented in Fig. 8.

The mechanism which provides for latching of dog 36 with recess 41 is designated generally by the numeral 47 and is seen in operative condition in Figs. 9 and 11. There, a lever arm 48 is seen pivoted to an approximately vertical position and is located in the path of arm member 43 and prior to the engagement of arm member 43 with post 46. The lever arm 48 thus halts the rotation of arm member 43 at such a position that the pivotal movement of cam 36a occurs before the dog 36 is aligned with recess 41. The subsequent release of the cam 36a by the cam roller 45 when the cam roller 45 is effectively positioned by lever arm 48, occurs just before the dog 36 approaches a position of registry with recess 41. Thus, the dog 36 can enter recess 41 and cause shaft 19 to rotate concurrently with worm gear 35. The pivotal action of lever arm 48 in moving from the position seen in Fig. 10 to that shown in Fig. 11 effectively kicks back the arm member 43 to the position shown in Fig. 12 and away from its position of repose against post 46.

Lever arm 48 is pivotally actuated from its position seen in Fig. 10 to that shown in Fig. 11 through the operation of a linkage element 49 which has a depending projection 50 engaged by the cluster of cases 11 (best seen in Fig. 1). Ordinarily, the linkage element 49 is urged to the left in Fig. 1 under the influence of spring 51, which is connected between one end of linkage element 49 and the left-hand channel 18. When the depending portion 50 of linkage element 49 is pushed to the right by a full complement of cases 11 being positioned within the taping area, the movement of linkage element 49 pivots lever arm 48 upwardly and into the position shown in Fig. 11. For this purpose, linkage element 49 is slidably carried in a sleeve bearing 52 attached to the right-hand channel 18. The depending portion 50 of the linkage element 49 is pivotally connected thereto by means of a collar 58 so that as arm 21 completes its circuit about the cluster of cases 11, it can engage the depending portion 50 and pivot it out of its path. The pivotal action thus achieved permits the spring 51 to move linkage element 49 to the left (as seen in Fig. 1), and out of the path of arm element 43. Arm element 43 thereupon is free to move under the urging of cam 36a into a position of repose against post 46, which necessarily results in the prevention of dog 36 from entering recess 41.

After arm 21 has passed beyond the depending portion 50 of linkage element 49, the depending portion 50 is free under its own weight to rotate downwardly and into the positions shown in the drawing. Thereupon it is ready for subsequent lateral movement under the urging of a full complement of cases. So long as the depending portion 50 is not urged to the right, the shaft 19 remains disengaged from worm gear 35 and thus arm 21 is stationary.

As the arm 21 completes a traverse of the periphery of an article to be taped, a depending shaft 26a (see Fig. 4) of arm 26 enters a channel 53 provided on frame 10. Further movement of arm 21 causes depending shaft 26a to engage a pivotally mounted lever arm 54, also mounted on a subframe 53a of frame 10. As best seen from a comparison of Figs. 5 and 6, the engagement of depending shaft 26a with the lever arm 54 causes counterclockwise pivoting of lever arm 54. The other end 54a of lever arm 54 bears against a pivotal knife edge body 55, the pivotal movement of which is in a vertical plane, and causes severance of tape 12 by cooperation with a stationary knife edge 56. Simultaneously therewith, another portion of the pivotal knife edge body 55, the other portion being designated 57, is pivoted upwardly and into engagement with a beveled surface 58 of the stationary knife 56. The other portion 57 (as best seen in Fig. 6) is equipped with a resiliently mounted clamping block 59 which holds the tape tail in place pending the initiation of another taping operaton.

The lever arm 54 is so located in the path of depending shaft 26a that it is maintained in the condition shown in Fig. 6 when arm 21 is stationary by virtue of the disengagement of dog 36 from recess 41. Thus, the tape tail clamping means, including pad 59 and the beveled surface 58 of the stationary knife 56, remains operative to maintain the tape 12 in a condition for ready application to a new cluster of boxes or other article operative to signal depending portion 50 of the linkage element 49.

In the operation of the device, cases 11, for example, may be arranged in stacks three high and three wide and successively (in rows nine long) advanced into the frame 10. As the last row of nine is advanced, the overall cluster bears against the depending arm portion 50 and urges it against the influence of spring 51 to pivot lever arm 48 upwardly and against the arm element 43. Arm element 43 thus is in a position to trigger the dog 46 prematurely, i.e., before it is in a position of alignment with recess 41. Thereupon, the dog 36 enters recess 41, and arm 21 is driven by worm gear 35. Arm 21 begins to rotate and depending shaft 26a releases lever arm 54, thereby stopping the clamping action of pad 59 and stationary knife 56 on the tail of tape 12. However, at this time, as can be seen from Fig. 6, the presser roller 28 is urging the tape against a box 11 and continues to do so as the tape is unwound from spool 27. The presser roller 28, being rotatably mounted on a movable arm 26, follows the contour of the cluster of cartons, moving in and out, as the case may be, in order to perfectly press the tape into and around corners. Meanwhile, the tape supply spool 27 is positioned well outwardly of the cluster of cases 11, so that it is freely unwound by virtue of its tail being secured to the cluster of cases 11.

As the cluster is just about completely taped, the depending shaft 26a enters channel 53 and trips the lever arm 54 to pivot the movable knife edge body 55 into a cutting relationship with the stationary knife edge body 56. In reaching the end of its traverse about the cluster of cases 11, the arm 21 has "kicked" the depending arm 50 upwardly, which permits it to be moved inwardly and over the cluster of cases 11, which in turn moves lever arm 48 out of the path of arm member 43. Arm member 43 thereupon assumes a stationary position against post 46 and triggers dog 36 at just the moment it would be positioned to enter recess 41. This condition persists until the cluster of cases 11 that have already been taped are removed and a new supply is operative to bear against the depending arm portion 50 and once again pivot lever arm 48 upwardly and into the position seen in Figs. 9 and 11.

While, in the foregoing specification, a decription of an embodiment of the invention has been set forth in considerable detail for the purpose of clearly explaining the invention, it will be apparent to those skilled in the art that many variations in the details of the invention may be made without departing from the spirit and scope thereof.

I claim:

1. In perimetric taping apparatus, a frame, an arm journalled for rotation in said frame over an article to be perimetrically taped, a subframe on said arm spaced sufficiently from the rotational mounting of said arm to circumscribe the periphery of the said article, said subframe providing a pair of arcuately shaped members positioned in a plane below and parallel to the plane defined by the rotation of said arm, one of said members carrying a supply of tape and having an unattached end positioned forwardly of said arm, the other arm having an attached end trailing the rotation of said arm, the unattached end of said other member rotatably carrying a tape-pressing roller, said frame being equipped with means for rotating said arm, and means for coupling said arm and rotating means for only one rotation of said arm.

2. The structure of claim 1 in which said coupling means includes gear means journalled for free rotation about a vertically-extending arm shaft, said gear means being equipped with dog means for coupling said shaft with said gear means.

3. The structure of claim 2 in which said frame is equipped with means responsive to the positioning of an article to be perimetrically taped for actuating said dog means to couple said shaft and gear means.

4. The structure of claim 2 in which said gear means is adapted to continuously revolve about said shaft and post means are provided on said frame for pivoting said dog means out of coupling relationship with said shaft on each revolution of said gear means.

5. An apparatus for perimetric taping, a frame providing a space therein for positioning of an article to be perimetrically taped, a vertical shaft journalled for rotation in said frame above the center of said space, said shaft being equipped with a horizontally-extending arm having a tape-providing subframe adjustably mounted thereon for location at spaced distances from said shaft, means on said frame for rotating said shaft one revolution, said rotating means including gear means freely rotatable about said shaft, said gear means pivotally supporting detent means engageable with said shaft for causing rotation thereof, and means for continuously rotating said gear means.

6. The structure of claim 5 in which said shaft is equipped with a recess engageable by said detent means, said detent means being pivotal out of recess engagement each revolution of said gear means by post means on said frame, said shaft being equipped with a laterally-extending arm selectively engageable with said post means and tape-signalling means for pivoting said detent means, said tape-signalling means effectively preventing operation of said post means in pivoting said detent means out of recess engagement.

7. In taping apparatus, a frame equipped with an article-receiving space, an arm rotatably supported on said frame for movement through said space adjacent one side thereof, said arm carrying tape-supplying and tape-pressing means, tape-severing means mounted on said frame in the path of movement of said tape-pressing means, said tape-severing means including a movable knife, and means on said tape-pressing means for engaging said knife to move the same in a tape-severing operation.

8. The structure of claim 7 in which said frame is equipped with a stationary knife member and said knife is equipped with abutment means engageable with said knife member whereby said tape is simultaneously severed and clamped.

9. In taping apparatus, a frame equipped with an article-receiving space, an arm rotatably supported on said frame for movement through said space adjacent one side thereof, said arm carrying tape-supplying and tape-pressing means, said tape-pressing means including arm means extending laterally from said arm and carrying said tape-pressing means remote from said arm, and means on said arm means resiliently urging said arm means toward the rotatable connection of said arm.

10. In perimetric taping apparatus, a frame, an arm journalled for rotation in said frame over an article to be perimetrically taped, and a subframe on said arm spaced sufficiently from the rotational mounting of said arm to circumscribe the periphery of said article, said subframe providing a pair of arcuately shaped members positioned in a plane below and parallel to the plane defined by the rotation of said arm, one of said members carrying a supply of tape and having an unattached end positioned forwardly of said arm, the other member having an unattached end trailing the rotation of said arm, the unattached end of said other member rotatably carrying a tape-pressing roller, said other member being pivotally related to said arm and equipped with means biasing the unattached end of said other member toward the rotational mounting of said arm.

11. In apparatus for perimetric taping, a frame providing a space therein for positioning of an article to be perimetrically taped, a vertical shaft journalled for rotation in said frame above the center of said space, said shaft being equipped with a horizontally-extending arm having a tape-providing subframe adjustably mounted thereon for location at spaced distances from said shaft, means on said frame for rotating said shaft one revolution, and cooperating movable and stationary knife members on said frame in the path of movement of said subframe, said movable knife member being engaged by said subframe for cutting and clamping said tape.

12. In apparatus for perimetric taping, a frame providing a space for the positioning of an article to be perimetrically taped, a subframe mounted on said frame for generally circular movement about said space, the forward portion of said subframe being equipped with tape-dispensing means, and simultaneously operative tape-cutting and tape-holding means on said frame positioned in the path of said subframe, said tape-cutting and said tape-holding means being actuated by engagement with said subframe with said tape-holding means being adjacent said tape-cuting means and on the forward side thereof to secure the tape end extending from said tape-dispensing means.

13. In apparatus for perimetric taping, a frame providing a space for the positioning of an article to be perimetrically taped, a subframe mounted on said frame for generally circular movement about said space, said subframe being equipped with tape-dispensing means, tape-cutting means on said frame positioned in the path of said subframe, and tape-holding means on said frame adjacent said tape-cutting means, said tape-cutting means including a fixed knife edge and a pivotal knife edge, said pivotal knife edge being engageable by said subframe once each revolution thereof for pivoting said pivotal knife edge into engagement with said fixed knife edge to cut said tape.

14. The structure of claim 13 in which said pivotal knife edge is equipped with a resiliently mounted clamping pad engageable with a body portion of said fixed knife edge for clamping tape.

15. In taping apparatus, a frame epuipped with an article-receiving space, an arm rotatably supported on said frame for movement through said space adjacent one side thereof, said arm carrying tape-supplying and tape-pressing means, said tape-pressing means being located in following relation with said tape-supplying means and equipped with shaft means, and means for rotating said arm upon a signal from the article to be taped, the last-mentioned means also providing means for stopping the rotation of said arm, said frame being equipped with tape-severing means and tape-holding means actuated by said shaft means.

16. In taping apparatus, a frame equipped with an article-receiving space, an arm rotatably supported on said frame for movement through said space adjacent one side thereof, said arm carrying tape-supplying and tape-pressing means, and tape-severing means mounted on said frame in the path of movement of said tape-pressing means, said tape-severing means including fixed and movable cooperating knife means, said movable knife means being actuated by said tape-pressing means with said fixed knife means being positioned within the peripheral path defined by said tape-pressing means and exteriorally of an article being taped whereby tape of a length slightly greater than the perimeter of said article is necessarily provided for overlapping the tape ends.

17. In taping apparatus, a frame equipped with an article-receiving space, an arm rotatably supported on said frame for movement through said space over an article positioned therein, said arm carrying tape-supplying and tape-pressing means, said tape-pressing means including arm means extending laterally from said arm and carrying said tape-pressing means remote from said arm, means on said arm means resiliently urging said arm means toward the rotatable connection of said arm, and tape-severing means mounted on said frame in the path of movement of said tape-pressing means, said tape-severing means including knife means actuated by said tape-pressing means, said knife means including a fixed member effective to space the ends of tape from said article whereby a length of tape is provided sufficient to have the ends thereof overlap when secured to said article.

18. In apparatus for perimetric taping, a frame rotatably supporting a main arm, means for rotating said main arm, the length of said main arm being such that one end thereof is adapted to circumscribe an article to be taped perimetrically, a subframe secured to said main arm adjacent said one end, said subframe being equipped with a pair of subframe arms extending laterally outward of the main arm, one of said subframe arms adjacent its end remote from said main arm being equipped with a tape source, the other of said subframe arms being equipped at its end remote from the said main arm with tape-pressing means, the other subframe arm being pivotally mounted on said subframe for arcuate movement relative thereto, and resilient means on said other subframe arm for urging said other subframe arm inwardly toward said article.

References Cited in the file of this patent
UNITED STATES PATENTS

| | | |
|---|---|---|
| 1,196,466 | Lindgren | Aug. 29, 1916 |
| 1,571,573 | Cranston | Feb. 2, 1926 |
| 2,591,136 | Cleary | Apr. 1, 1952 |